United States Patent Office 3,079,268
Patented Feb. 26, 1963

3,079,268
CEMENTING COMPOSITION
Fred A. Brooks, Jr., Houston, Tex., assignor, by mesne assignments, to Jersey Production Research Company, Tulsa, Okla., a corporation of Delaware
No Drawing. Filed Apr. 25, 1960, Ser. No. 24,225
7 Claims. (Cl. 106—90)

The present invention is directed to a low density oil emulsion cementing composition. More specifically, the invention is concerned with a low density oil emulsion cementing composition for use in cementing oil and gas wells. More particularly, the invention is directed to a cement composition which has a low density and a high early strength.

The present invention may be briefly described as a low density highly early strength cementing composition which comprises an oil-in-water emulsion, silica-alumina having a particle size within the range from about 0.1 to about 80 microns, and cement, the silica-alumina being present in an amount from about 3 to about 5 grams per 100 grams of the cement.

Attempts have been made in recent years to develop low density cement slurries for the primary cementing of casing and oil wells. The basic advantage of a low density slurry in this particular operation is the development of low hydrostatic heads by long strings of cement. This results in easy placement of cement at low-pump pressures and prevents uncontrolled formation fracturing which occurs when high-pump pressures are employed in introducing cement into oil and gas wells. A need exists for slurries having a low density within the range from about 10 to about 12.5 pounds per gallon with acceptable set properties and reasonable costs.

It has now been discovered that a superior low density cement slurry may be obtained by admixing with the cement a small amount of silica-alumina having a particle size within the range of about 0.1 to about 80 microns and by emulsifying a hydrocarbon oil in the continuous external water phase of an oil-emulsion cement.

The composition of the present invention has a composition such as set out in Table I.

The oil employed in the practice of the present invention may suitably be kerosene, gas oil, diesel oil and other hydrocarbons which have a specific gravity in the range from about 0.65 to about 0.95; a specific gravity of about 0.8 is preferred.

The emulsifying agent employed in the composition will suitably be an anionic or a nonionic emulsifying agent. A water soluble emulsifying agent may be used. Examples of the emulsifying agent include calcium lignosulphonate and Nacconol SX which are anionic emulsifiers; Renex 30, which is a polyoxyethylene alkyl ether which is nonionic; and OPE–30, which is octyl phenol 30 ethylene oxide, may be used as emulsifying agent. Other emulsifying agents may be employed such as, for example, OPE–3, which is oxtyl phenol 3 ethylene oxide, and Triton X–100, which is isooctyl phenyl polyethoxy ethanol. It may be desirable to use the OPE–30 in the water and the OPE–3 in the hydrocarbon. The Renex 30 may also be used as an emulsifier with calcium lignosulphonate which would then function as an emulsifier and cement set retarder. Other emulsifying agents which may be used are those such as disclosed in U.S. Patent 2,801,931.

The silica-alumina employed in the composition of the present invention comprises about 75 percent of silica and about 25 percent of alumina. The silica-alumina, when added to the composition of the present invention in conjunction with an oil-emulsion cement, produces a composition having unexpected properties in that it will set with a high early strength and has a low density as required in cementing operations to avoid formation fracturing and other undesirable features attendant to employing the high density cements currently used.

In order to illustrate the invention further, a number of cement compositions were made up in accordance with the present invention wherein water, kerosene and silica-alumina were employed. In one instance the silica-alumina had added to it calcium hydroxide. These operations were compared to a slurry which contained bentonite, which is a montmorillonite. Results from these operations are presented in Table II.

TABLE II

*Properties of Low Density Cement Slurries*

| Slurry | Components per 100 g. Cement | | | | | Density, lbs./gal. | One-Day Compressive Strength, p.s.i.[1] | Thickening Time, Hours API (schedule 3) |
|---|---|---|---|---|---|---|---|---|
| | Water, ml. | Kerosene, ml. | Solid Additive, g. | Solid Additive, g. | Solid Additive, g. | | | |
| 1 | 100 | 55 | 2.0 silica-alumina | | .25 calcium ligno-sulfonate. | 10.9 | 140 | |
| 2 | 100 | 55 | 3.0 silica-alumina | | do | 10.95 | 153 | |
| 3 | 100 | 55 | 3.25 silica-alumina | | do | 10.9 | 188 | |
| 4 | 100 | 55 | 4 silica-alumina | 2 Ca(OH)₂ | do | 10.95 | 204 | |
| 5 | 100 | 55 | do | 1 Ca(OH)₂ | do | 10.95 | 206 | 3:45 |
| 6 | 100 | 55 | do | | do | 10.85 | 153 | |
| 7 | 100 | 55 | 10 silica-alumina | | do | 11.00 | 186 | |
| 8 | 105 | 55 | 2 bentonite | | do | 10.85 | 113 | |

[1] Cured according to API Schedule 3 S.

TABLE I

| | | |
|---|---|---|
| Silica-alumina | grams | 3–5 |
| Cement | do | 100 |
| Water | ml | 95–110 |
| Oil | ml | 50–65 |
| Emulsifying agent | grams | 0.25–5.0 |

The silica-alumina has particle sizes within the range from about 0.1 to about 80 microns and preferably within the range from about 0.1 to about 40 microns. The cement employed in the practice of the present invention is preferably Portland cement but other hydraulic cements may be used.

From an examination of the data in Table II it will be clear that slurries 3 and 4 had one-day compressive strengths substantially greater than slurry No. 8 which contained bentonite. It will also be apparent from an examination of the data in Table II that slurry No. 5 which contained 4 grams of silica-alumina and 1 gram of calcium hydroxide had a one-day compressive strength nearly twice that of the slurry containing bentonite. Calcium hydroxide in amounts of 1 gram per 100 grams of cement improves the early strength of the cement but larger amounts give no further improvement. The data for slurry No. 7 shows that amounts of the silica-alumina greater than 5 grams per 100 grams of cement give no further improvement over lesser amounts.

In making up the compositions of the present invention, an oil-in-water emulsion is formed by mechanical agitation with the addition of about 50 to 65 ml. of a hydrocarbon oil per 100 grams of cement, the hydrocarbon oil having a specific gravity of approximately 0.8. This is then added to about 95 to about 110 ml. of water per 100 grams of cement, the water containing an emulsifying agent which may be of the nonionic or anionic type. Calcium lignosulphonate is an anionic emulsifier which has been employed satisfactorily in the practice of the present invention. Nonionic agents which have been used satisfactorily include Renex 30 and OPE-30. As stated heretofore, it is possible to use two emulsifying agents with one soluble in water and the other soluble in oil. For example, OPE-30 may be used in the water and OPE-3 in the hydrocarbon oil. To the oil-in-the-water emulsion there is then added with mechanical agitation a dry blend of about 3 to about 5 grams of silica-alumina and 100 grams of cement. The silica-alumina may suitably comprise about 75 percent of silica and about 25 percent of alumina and may be substantially free of contaminants. This is then added to the normal Portland cement which may be of API class A.

In employing the composition of the present invention, the composition may suitably be used in cementing casings in a borehole in the earth. The cement may be forced down the casing and up the annulus between the outer surface of the casing and the wall of the borehole to cement the casing in the borehole. Likewise, the cement composition of the present invention may also be used in remedial operations and in workover operations in oil and gas wells. For example, it may be desirable to plug perforations in a well casing. The composition of the present invention is satisfactory for use in this respect. Also, the composition of the present invention may be suitably employed in repairing channels back of the casing which allows communication from one zone to the other. For example, sometimes there is communication between a water-bearing zone and a hydrocarbon-bearing zone and is desirable to shut off this communication. The composition of the present invention works satisfactorily in performing such water shutoffs and the like.

The present invention is quite advantageous and useful in that a high early strength cement of low density is provided. The unique properties of the present invention are due to the presence of the oil and the silica-alumina of finely divided size.

The nature and objects of the present invention having been completely described and illustrated, what I wish to claim as new and useful and secure by Letters Patent is:

1. A low density high early strength oil and gas well cementing composition which consists essentially of an oil-in-water emulsion, silica-alumina comprising about 75% of silica and about 25% of alumina having a particle size within the range from about 0.1 to about 80 microns, and hydraulic cement, said silica-alumina being present in an amount from about 3 to about 5 grams per 100 grams of said cement, said silica-alumina being substantially free of contaminants, the oil in said oil-in-water emulsion being a hydrocarbon oil having a specific gravity within the range from about 0.65 to about 0.95.

2. A low density high early strength oil and gas well cementing composition which consists essentially of an oil-in-water emulsion, silica-alumina comprising about 75% of silica and about 25% of alumina having a particle size within the range from about 0.1 to about 80 microns, and hydraulic cement, said silica-alumina being present in an amount of 3 to about 5 grams per 100 grams of said cement, said oil and water being present, respectively, in amounts within the ranges from about 50 to about 100 ml. and from about 95 to about 110 ml. per 100 grams of said cement, said silica-alumina being substantially free of contaminants, the oil in said oil-in-water emulsion being a hydrocarbon oil having a specific gravity within the range from about 0.65 to about 0.95.

3. A composition in accordance with claim 2 in which an emulsifying agent is present in the emulsion in an amount within the range from 0.25 to 5.0 grams.

4. A composition in accordance with claim 2 in which the cement is Portland cement.

5. A composition in accordance with claim 3 in which the emulsifying agent is a water soluble salt of lignin sulfonic acid.

6. A composition in accordance with claim 2 which contains 1 gram of calcium hydroxide.

7. A composition in accordance with claim 2 in which the oil has a specific gravity of about 0.8.

References Cited in the file of this patent
UNITED STATES PATENTS

| | | |
|---|---|---|
| 2,410,954 | Sharp | Nov. 12, 1946 |
| 2,582,459 | Salathiel | Jan. 15, 1952 |
| 2,798,003 | Morgan | July 2, 1957 |
| 2,801,931 | Morgan | Aug. 6, 1957 |
| 2,803,556 | Carlsson et al. | Aug. 20, 1957 |
| 2,805,719 | Anderson | Sept. 10, 1957 |
| 2,840,483 | Morgan et al. | June 24, 1958 |
| 2,842,449 | Bearden et al. | July 8, 1958 |
| 2,987,408 | Minnick | June 6, 1961 |